US012196326B2

(12) United States Patent
Stoffers et al.

(10) Patent No.: US 12,196,326 B2
(45) Date of Patent: Jan. 14, 2025

(54) PRESSURE-REGULATING VALVE

(71) Applicant: HAMMELMANN GMBH, Oelde (DE)

(72) Inventors: Fabian Stoffers, Rheda-Wiedenbrück (DE); Malte Willems, Hamm (DE); Marc Grüter, Rheda-Wiedenbrück (DE)

(73) Assignee: Hammelmann GmbH, Oelde (DE)

( * ) Notice: Subject to any disclaimer, the term of this patent is extended or adjusted under 35 U.S.C. 154(b) by 0 days.

(21) Appl. No.: 17/921,770

(22) PCT Filed: Apr. 26, 2021

(86) PCT No.: PCT/EP2021/060828
§ 371 (c)(1),
(2) Date: Oct. 27, 2022

(87) PCT Pub. No.: WO2021/224048
PCT Pub. Date: Nov. 11, 2021

(65) Prior Publication Data
US 2023/0167908 A1    Jun. 1, 2023

(30) Foreign Application Priority Data
May 6, 2020    (DE) ............ 10 2020 112 308.6

(51) Int. Cl.
*F16K 1/38*    (2006.01)
*F16K 1/42*    (2006.01)
(Continued)

(52) U.S. Cl.
CPC ............ *F16K 1/385* (2013.01); *F16K 1/42* (2013.01); *F16K 27/0254* (2013.01); *G05D 16/2013* (2013.01)

(58) Field of Classification Search
CPC . F16K 1/3885; F16K 1/42; F16K 1/44; F16K 27/0254; F16K 11/04; F16K 37/0041; G05D 16/2016; G05D 16/103
See application file for complete search history.

(56) References Cited

U.S. PATENT DOCUMENTS 4,679,592 A    7/1987  Lamb
4,844,111 A *  7/1989  Pritchard ............... G05D 16/10
                                                137/71
(Continued)

FOREIGN PATENT DOCUMENTS

BE    362805 A    8/1929
CN    2106272 U   6/1992
(Continued)

OTHER PUBLICATIONS

Office Action created Jan. 17, 2023 in related/corresponding DE Application No. 10 2020 112 308.6.
(Continued)

*Primary Examiner* — Patrick C Williams
(74) *Attorney, Agent, or Firm* — PATENT PORTFOLIO BUILDERS PLLC

(57) ABSTRACT

A pressure-regulating valve for a fluid medium that is at system pressure, e.g., for system pressures >1000 bar, has a valve housing with an inlet channel and at least one outlet channel. A valve seat arranged in the valve housing has a conical recess holding an axially mobile valve body with a lateral outer surface at least part of which is conical. The interaction of the valve body and valve seat regulate throughflow of medium from the inlet channel to the outlet channel. The valve seat, adjacent to the lateral outer surface of the valve body, includes a first pressure chamber from which there extends, in the direction of movement of the valve body, a throttle gap along the lateral outer surface of the valve body. The conical lateral outer surface of the valve (Continued)

Figure 1:
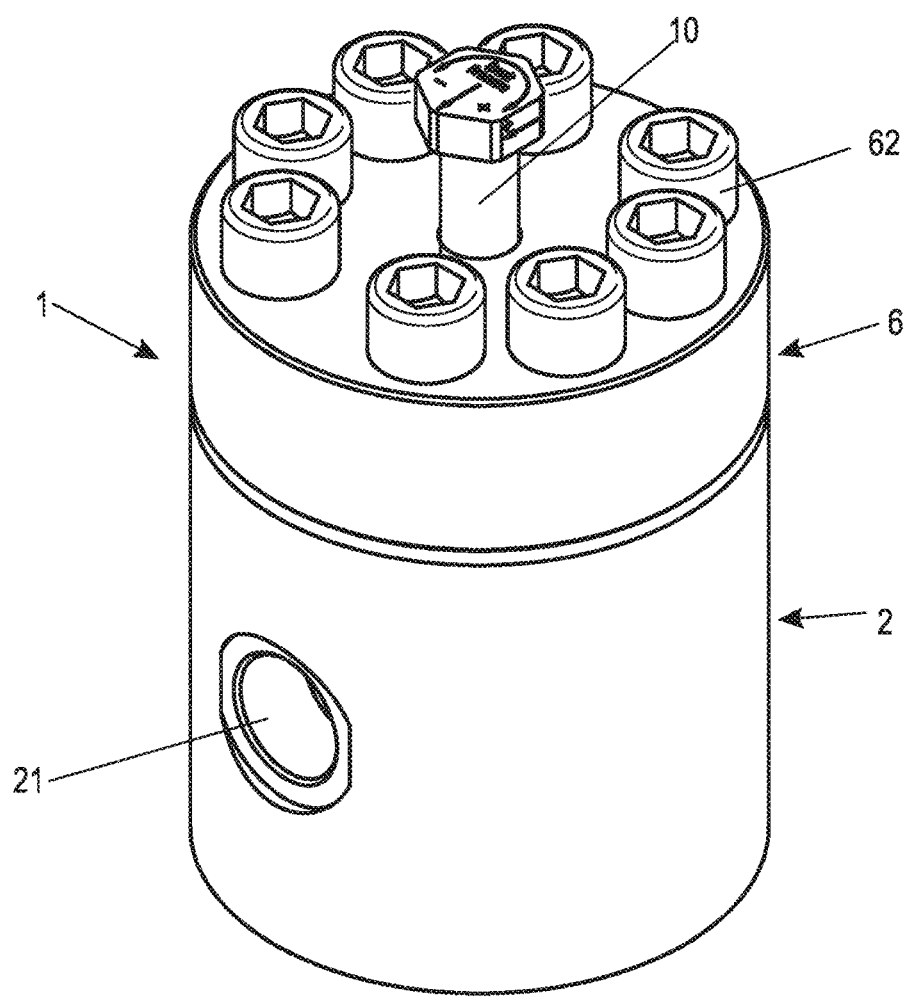

body extends, in the direction of movement of the valve body, on either side of the pressure chamber through the conical recess of the valve seat.

18 Claims, 9 Drawing Sheets

(51) Int. Cl.
*F16K 27/02* (2006.01)
*G05D 16/20* (2006.01)

(56) References Cited

U.S. PATENT DOCUMENTS

| | | |
|---|---|---|
| 2004/0173261 A1 | 9/2004 | Stoffers |
| 2006/0038154 A1* | 2/2006 | Fukano ............... B05B 12/149 251/321 |
| 2013/0068987 A1 | 3/2013 | Sun et al. |
| 2015/0059879 A1* | 3/2015 | Nakamura ............ F16K 47/04 137/505.21 |
| 2016/0018007 A1* | 1/2016 | Eckholz ................ F16K 1/38 251/318 |
| 2018/0087685 A1* | 3/2018 | Baumann ............. F16K 41/02 |

FOREIGN PATENT DOCUMENTS

| | | |
|---|---|---|
| CN | 1071496 A | 4/1993 |
| CN | 103591302 A | 2/2014 |
| CN | 104514892 A | 4/2015 |
| CN | 109099191 A | 12/2018 |
| DE | 102016001753 A1 | 8/2017 |
| EP | 1450082 B1 | 8/2006 |
| GB | 176653 A | 3/1922 |
| GB | 552186 A | 3/1943 |
| JP | S5460317 U | 4/1979 |
| WO | 2013109473 A1 | 7/2013 |

OTHER PUBLICATIONS

International Search Report and Written Opinion mailed Sep. 23, 2021 in related/corresponding International Application No. PCT/EP2021/060828.

* cited by examiner

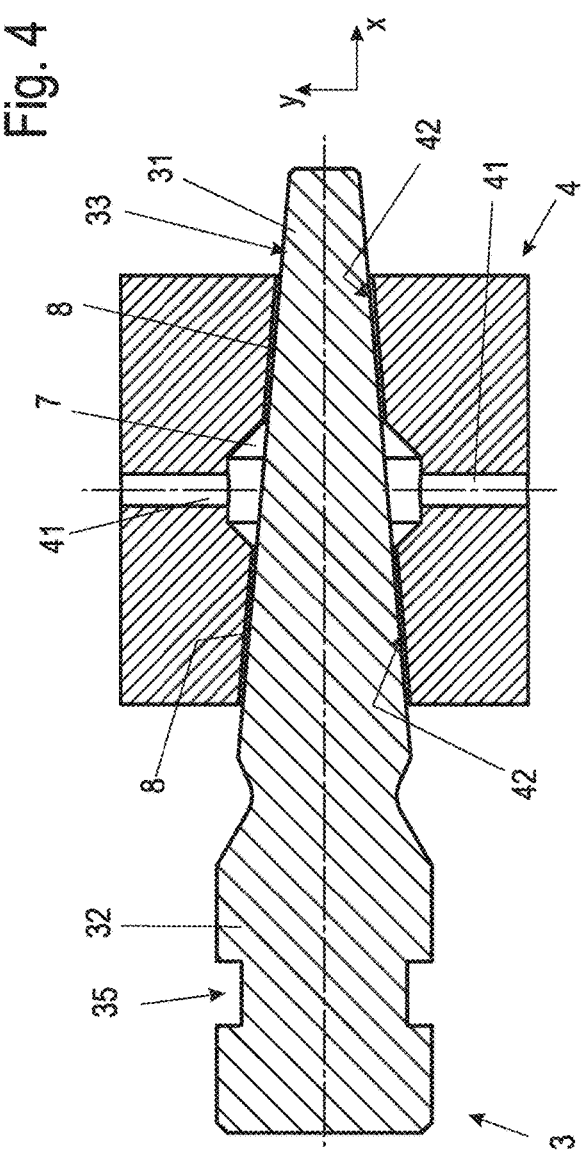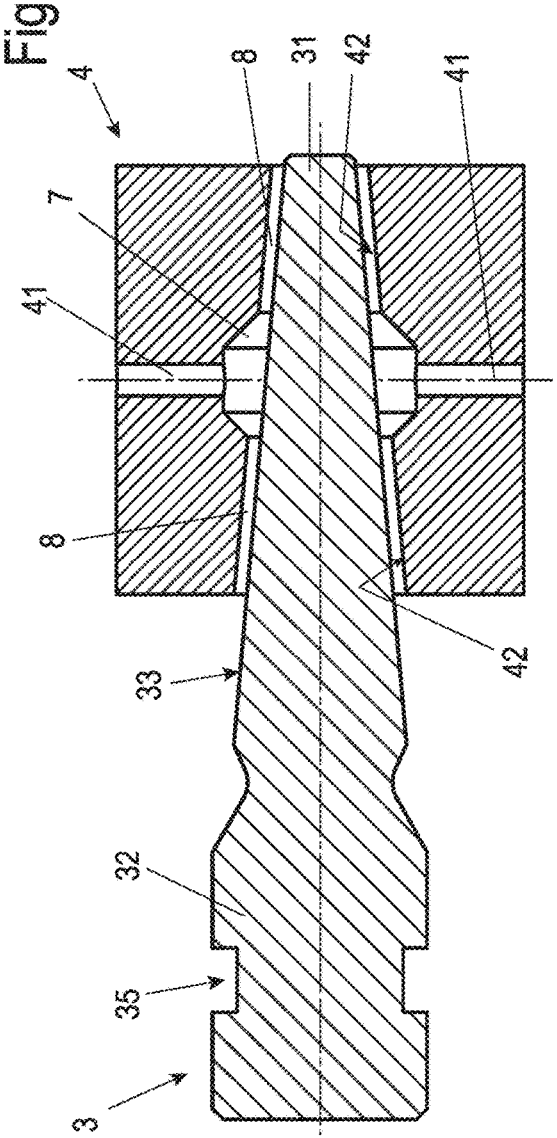

PRESSURE-REGULATING VALVE

BACKGROUND AND SUMMARY OF THE INVENTION

Exemplary embodiments of the present invention relate to a pressure regulating valve.

A generic pressure regulating valve is known, for example, from EP 1 450 082 B1.

Such pressure regulating valves are used in high-pressure technology to mitigate pressure fluctuations in high-pressure systems caused, for example, as a result of high-pressure consumers, such as high-pressure spray guns, being switched on or off. Furthermore, such pressure regulating valves are used to control the pressure, for example to control a pressure build-up or pressure reduction with a predetermined pressure gradient.

In addition to their use in high-pressure technology, such pressure regulating valves can also be used, for example, to homogenize media in process engineering. In this application, a homogenization of the medium conveyed through the pressure regulating valve is effected within the throttle range of such a pressure regulating valve, i.e., the viscosity or consistency of the same is influenced.

Such a pressure regulating valve usually has a valve housing having an inlet channel and at least one outlet channel for the passage of a fluid medium under system pressure. A valve seat is arranged in the valve housing, in which a valve body, which can also be referred to as a control in, is mounted in an axially movable manner and can be adjusted in the valve seat with the aid of an actuating unit in such a way that, as a result of an increase in the system pressure, the valve body is moved out of the valve seat to such an extent that a corresponding quantity of the fluid medium can flow out via the pressure regulating valve until the system pressure is reduced again to the predetermined level.

One problem with pressure regulating valves known from the prior art, especially those used in ultrahigh pressure technology of over 500 bar, is the large adjustment forces required to actuate the valve body under operating conditions. These large adjustment forces result in this case from the applied operating pressure and the pressurized projected area of the valve body in the adjustment direction.

Exemplary embodiments of the present invention are directed to a pressure regulating valve whose valve body can be controlled or moved with significantly lower adjustment forces and which, in addition, can dispense with the use of wear-prone dynamic high-pressure contact seals.

The pressure regulating valve according to the invention for a fluid medium under system pressure, preferably for system pressures above 500 bar, has a valve housing in which an inlet channel and at least one outlet channel communicating therewith for the medium are provided.

The pressure regulating valve also has a valve seat arranged in the valve housing with a conically shaped receptacle in which an axially movable valve body having an at least partially conically shaped lateral outer surface is mounted. An actuating unit is in operative connection with the valve body.

A throughflow of medium from the inlet channel to the at least one outlet channel can be regulated in this case by the valve body in interaction with the valve seat.

In the valve seat, a first pressure chamber is provided adjacent to the lateral outer surface of the valve body, from which a throttle gap extends in each case along the lateral outer surface of the valve body in the direction of movement of the valve body.

The conically shaped lateral outer surface of the valve body extends in this case in the direction of movement of the valve body on both sides of the pressure chamber through the correspondingly conically shaped receptacle of the valve seat.

In the pressure regulating valve according to the invention, throttling areas provided on both sides of the first pressure chamber and formed by respective throttle gaps between the lateral outer surface of the valve body and the inner surface of the valve seat enable the high-pressure medium, which has entered through the inlet, to be reduced by being discharged via the two throttle gaps.

The medium under high pressure always moves along the lateral outer surface of the valve body and thus enables the valve body to be adjusted with significantly less force since, due to the conicity of the valve body, only a fraction of the force acting on the valve body by the high pressure medium acts in the axial or adjustment direction of the valve body.

According to an advantageous embodiment variant of the invention, a second pressure chamber is formed in a region of the inner circumference of the valve housing adjacent to the valve seat, radially outside the first pressure chamber, into which the inlet channel opens.

Through this second pressure chamber, the applied operating pressure of the fluid medium also acts on the outer jacket of the valve seat, thus reducing deformation-induced widening of the throttle gap as a result of the above-mentioned high pressures.

The first pressure chamber and the second pressure chamber are preferably annular.

According to a preferred embodiment variant of the pressure regulating valve according to the invention, the valve seat is installed in a receptacle of the valve housing in such a way that it cannot move. Alternatively, the valve seat can also be designed as a component of the valve housing.

According to a preferred embodiment variant of the pressure regulating valve according to the invention, the actuating unit can be controlled via a control unit measuring a system pressure, wherein the valve body can be moved into a position enlarging or reducing the throttle gaps depending on the measured system pressure.

According to an alternative embodiment variant, the actuating unit is designed as a force-regulated control unit, wherein the valve body can be moved into a position enlarging or reducing the throttle gaps against the preset force of a force accumulator corresponding to a set pressure, depending on the applied system pressure.

This variant has the advantage of self-regulation of the pressure regulating valve, where only the force of the force accumulator acting on the actuating body needs to be adjusted.

According to a preferred embodiment variant of the pressure regulating valve, a diameter of the conically shaped receptacle and the part of the valve body formed with a conically shaped lateral outer surface is designed to increase towards the actuating unit.

According to an alternative embodiment variant, the diameter of the conically shaped receptacle and the part of the valve body with a conically shaped lateral outer surface is designed to decrease towards the actuating unit.

According to another advantageous embodiment variant of the invention, the valve seat has a plurality of pressure chamber inlet channels extending tangentially from the first pressure chamber to the second pressure chamber.

With such a variant, lateral flow forces on the valve body in the first pressure chamber can be avoided.

According to a further advantageous embodiment variant of the invention, a plurality of grooves is preferably formed on the conically shaped lateral outer surface of the valve body.

These grooves are preferably formed in the lateral outer surface of the valve body along a plane perpendicular to the direction of movement of the valve body. It is also conceivable to form such grooves in the conically shaped inner surface of the valve seat.

By forming such grooves, the homogenization result is positively influenced in case the pressure regulating valve is used for homogenization of media.

According to a preferred embodiment variant, the valve body and the valve seat are made of a hardened steel, hard metal, or ceramic.

According to another alternative embodiment variant of a pressure regulating valve according to the invention for a fluid medium under system pressure, preferably for system pressures >500 bar, the pressure regulating valve has a valve housing in which at least one outlet channel for the medium is provided.

In the valve housing, a valve seat arranged along a displacement axis is provided with an at least partially conically shaped receptacle in which a valve body fixed to the valve housing is mounted with an at least partially conically shaped lateral outer surface and an inlet channel.

The pressure regulating valve also has an actuating unit that is operatively connected to the valve seat.

A throughflow of medium from the inlet channel to the at least one outlet channel can also be regulated in this variant by the valve seat in interaction with the valve body.

A pressure chamber is provided in the valve seat adjacent to the lateral outer surface of the valve body, from which a throttle gap extends in each case along the lateral outer surface of the valve body in the direction of movement of the valve seat, wherein the conically shaped lateral outer surface of the valve body extends on both sides of the pressure chamber through the correspondingly conically shaped receptacle of the valve seat in the direction of movement of the valve seat.

In this embodiment variant, too, the medium under high pressure always moves along the lateral outer surface of the valve body and thus enables the valve seat to be adjusted with significantly less force since, due to the conicity of the valve body and the valve seat, only a fraction of the force acting on the valve seat by the high-pressure medium acts in the axial or adjustment direction of the valve seat.

According to an advantageous further development of this embodiment variant, the inlet channel extends in the direction of movement of the valve seat.

The valve body preferably has a plurality of pressure chamber inlet channels extending radially from the inlet channel into the pressure chamber.

The radial width of the pressure chamber preferably corresponds to the width of the throttle gaps.

In this case, the receptacle is preferably of pot-shaped design, having an outlet channel in the bottom of the receptacle that opens into a low-pressure chamber of the valve housing.

BRIEF DESCRIPTION OF THE DRAWING FIGURES

Figure 2:
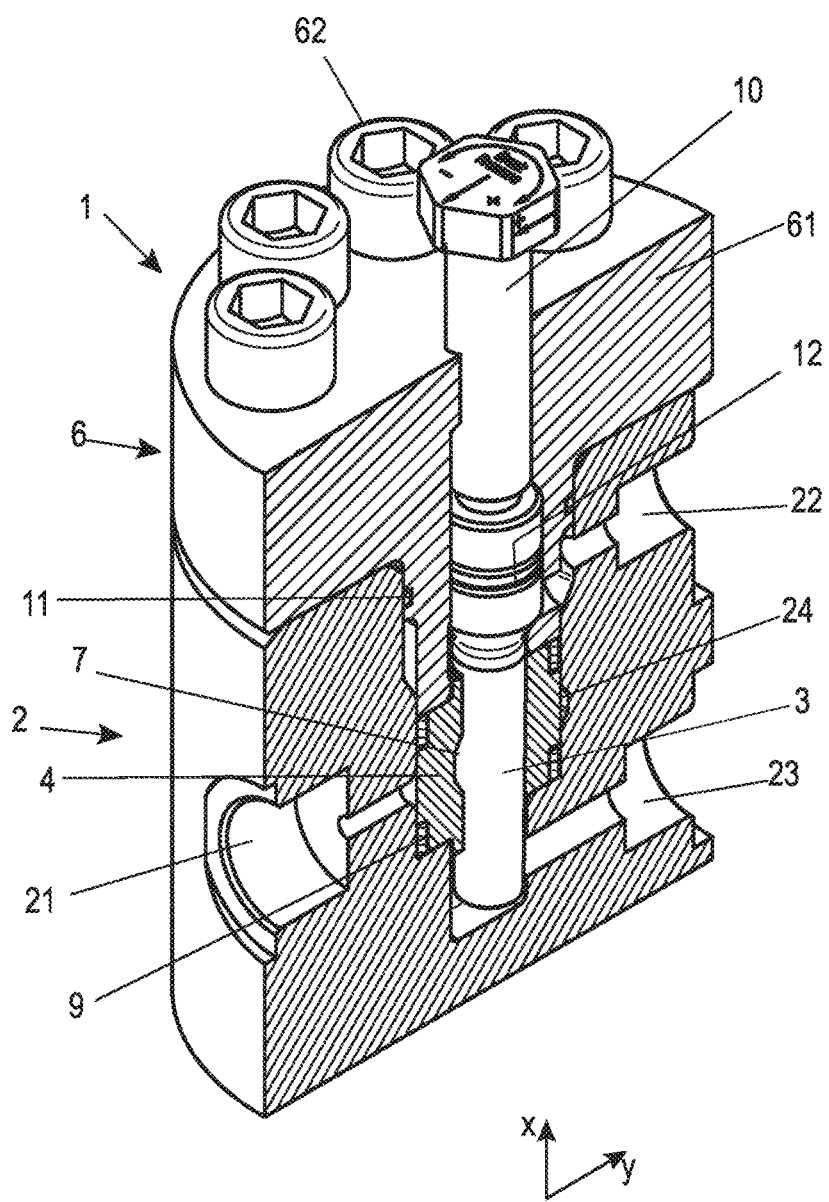
Figure 3:
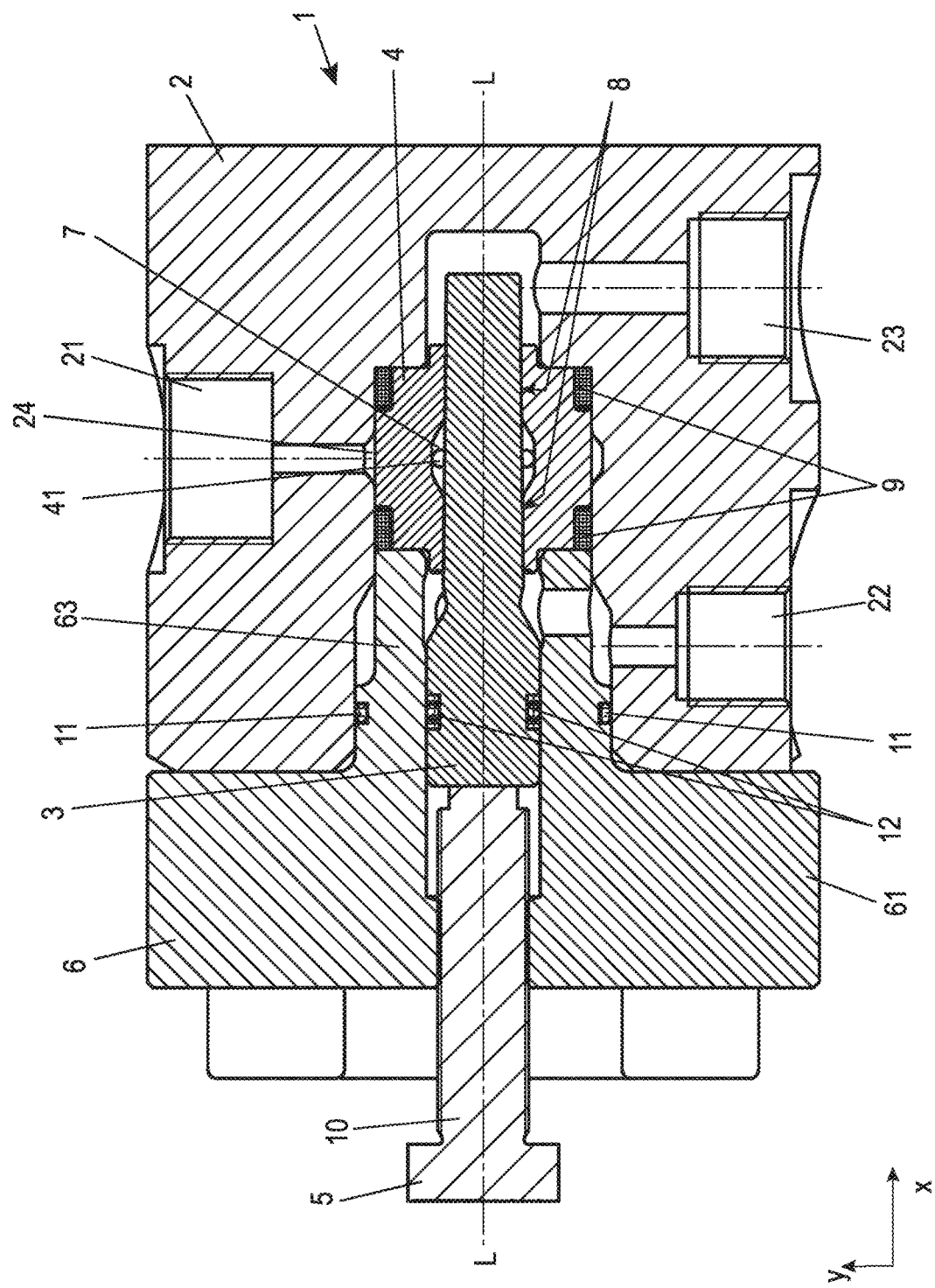
Figure 6:
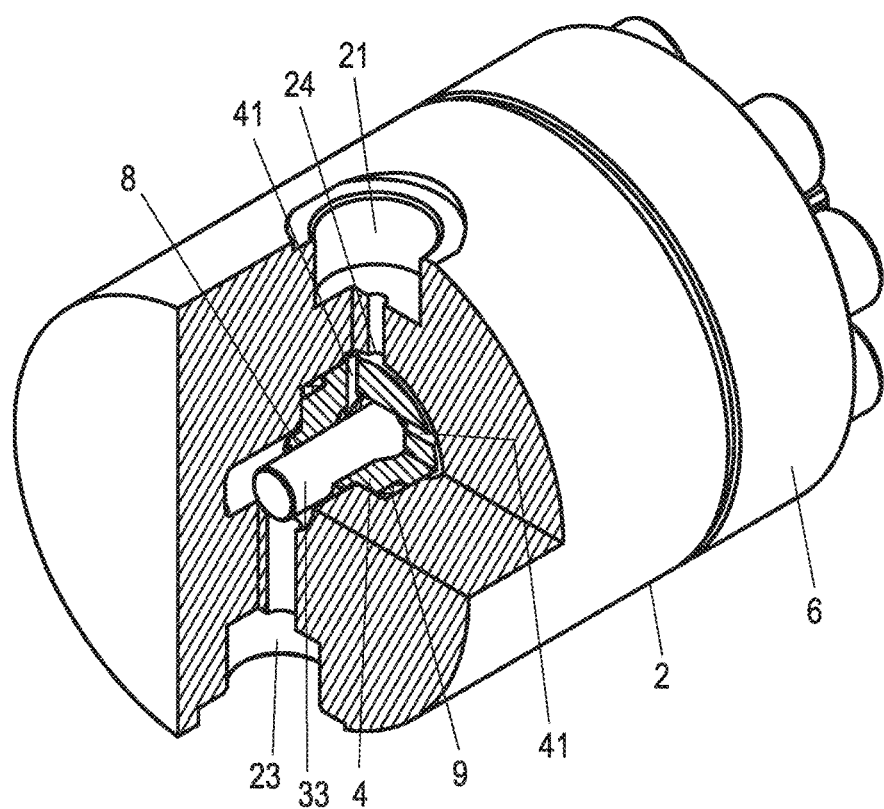
Figure 7:
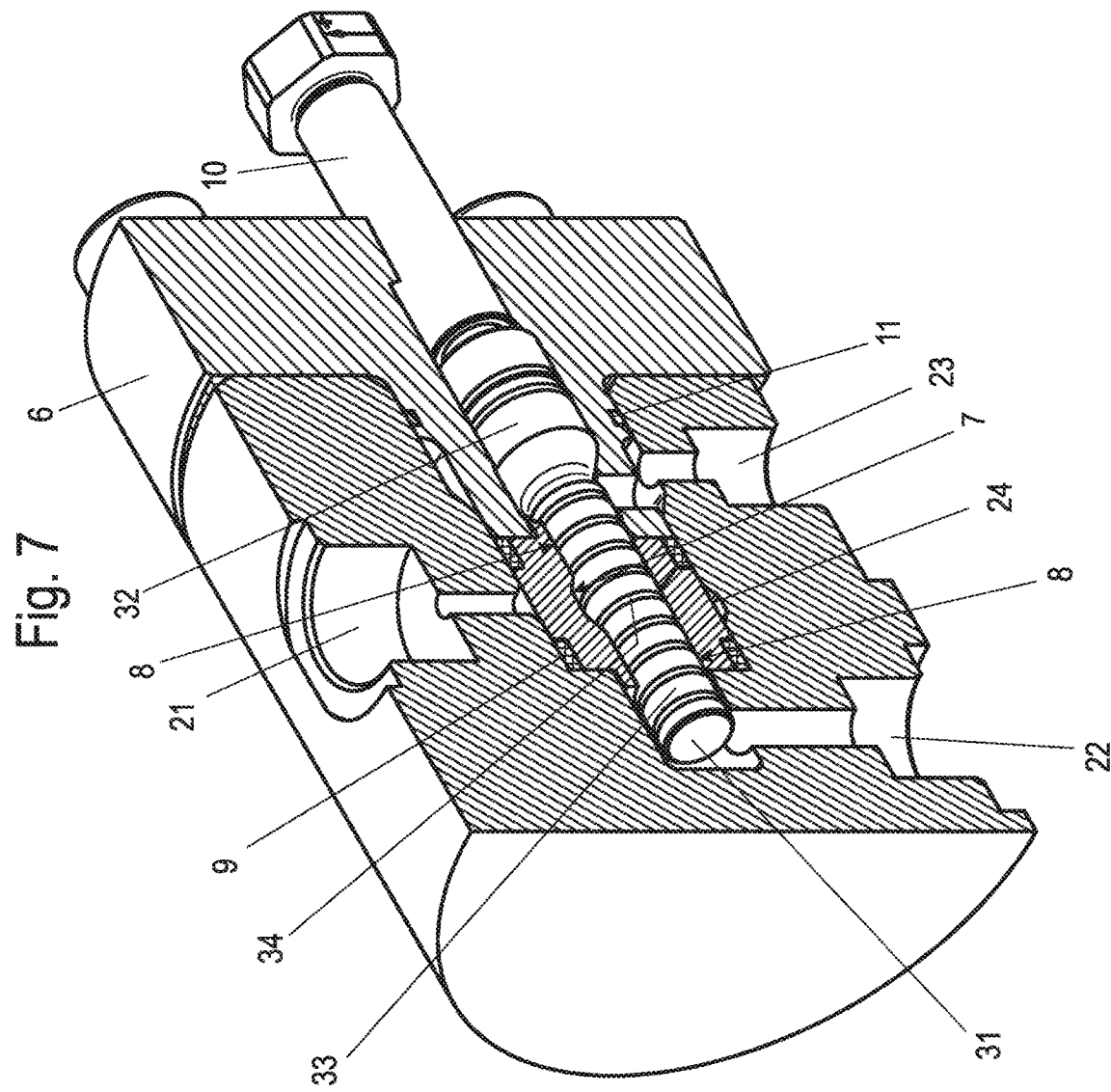
Figure 8:
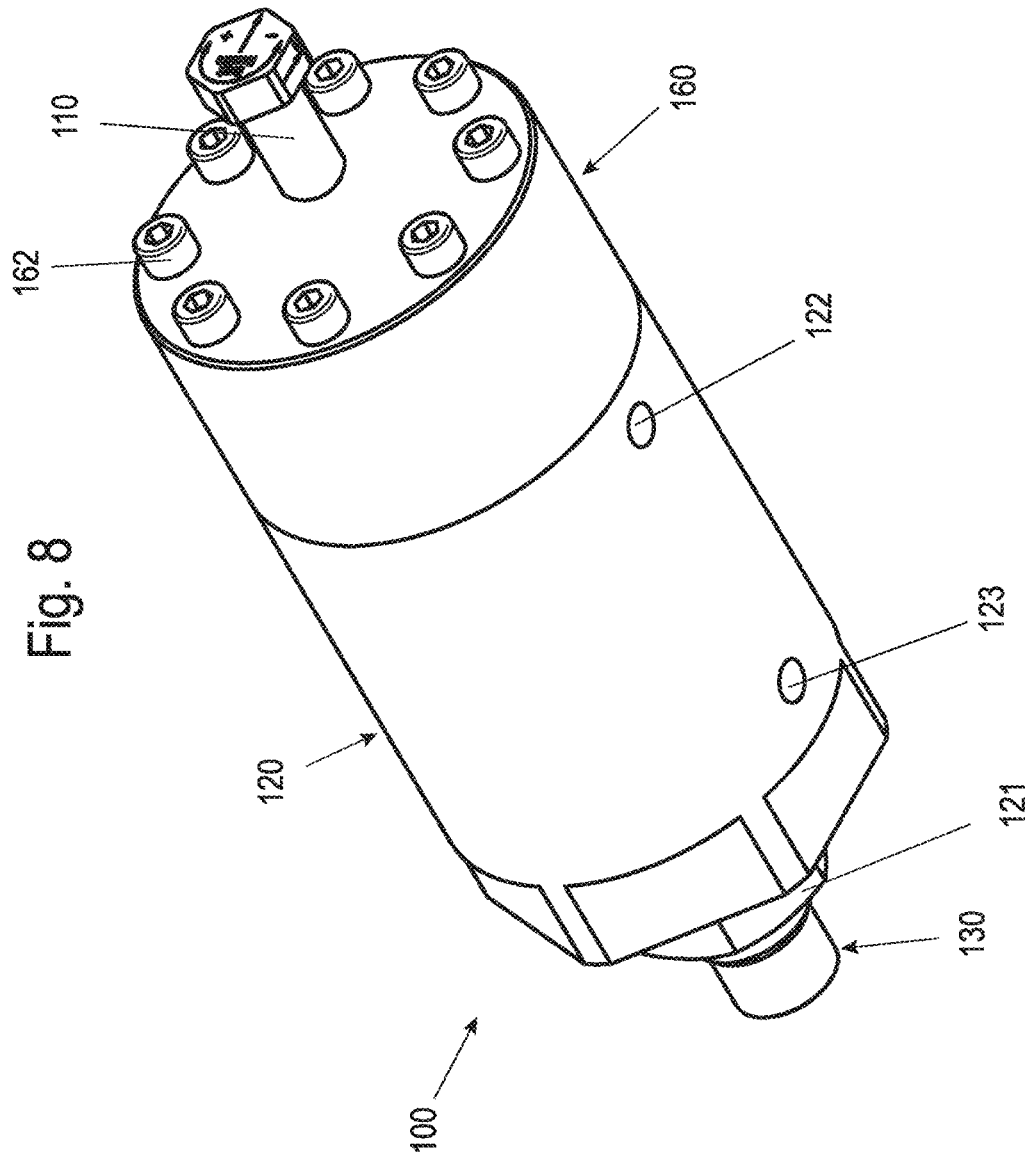
Figure 9:
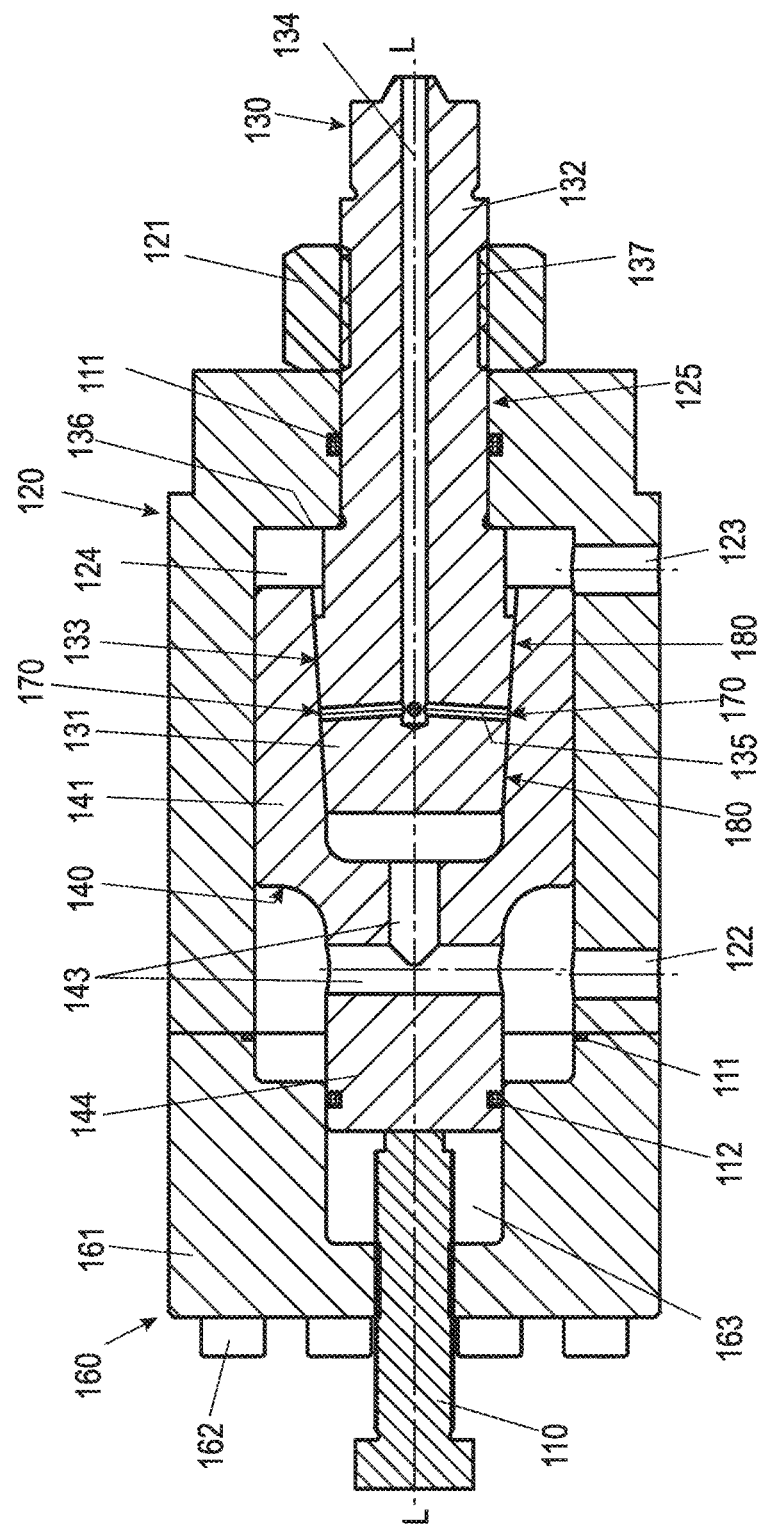
Figure 10:
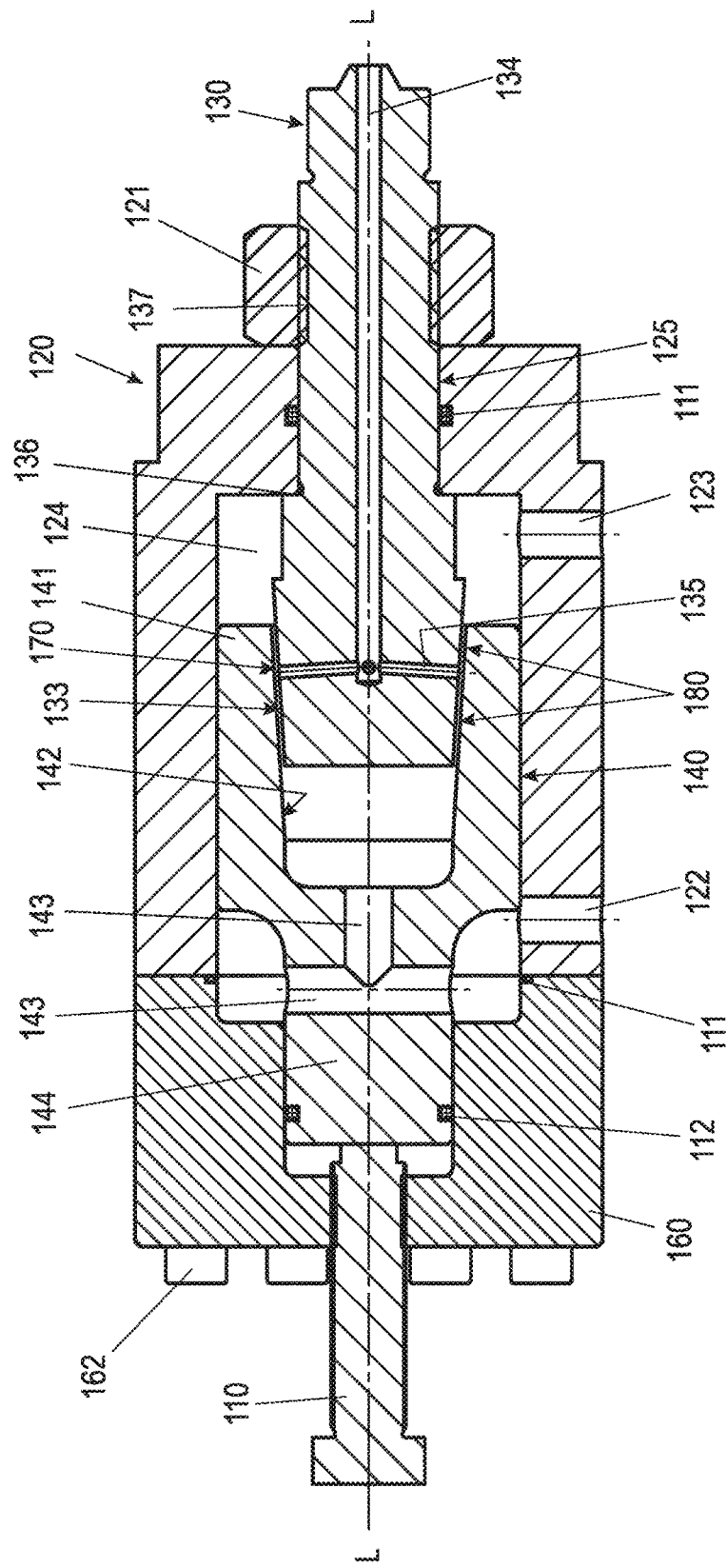

Preferred exemplary embodiments are explained in more detail below with reference to the accompanying figures, wherein:

FIG. 1 shows a schematic isometric representation of an embodiment variant of a pressure regulating valve according to the invention, FIG. 2 shows a schematic isometric elevation view of the pressure regulating valve shown in FIG. 1, FIG. 3 shows a sectional view through the pressure regulating valve shown in FIG. 1, FIG. 4 shows a schematic sectional view of the valve body received in the valve seat in a position of the valve body for producing small throttle gaps, FIG. 5 shows a representation corresponding to FIG. 4 in a position of the valve body for generating large throttle gaps, FIG. 6 shows another elevation view of the pressure regulating valve shown in FIG. 1 to illustrate tangentially extending pressure chamber inlet channels of the valve seat, FIG. 7 shows a representation corresponding to FIG. 2 of an alternative embodiment variant of a pressure regulating valve according to the invention with grooves provided on the conically shaped lateral outer surface of the valve body, FIG. 8 shows a schematic isometric representation of an alternative embodiment variant of a pressure regulating valve according to the invention, FIG. 9 shows a schematic sectional view of the pressure regulating valve according to FIG. 8 with the valve body received in the valve seat in a position of the valve seat for producing small throttle gaps, and FIG. 10 shows a representation corresponding to FIG. 9 in a position of the valve seat for producing large throttle gaps.

DETAILED DESCRIPTION

In the following figure description, terms such as top, bottom, left, right, front, rear, etc. refer exclusively to the exemplary representation and position of the pressure regulating valve, valve housing, valve body, valve seat, pressure chamber and the like selected in the respective figures. These terms are not to be understood restrictively, i.e., due to different working positions or the mirror-symmetrical design or the like, these references may change.

In FIGS. 1 to 3, the reference sign 1 is used to designate all in all one embodiment variant of a pressure regulating valve according to the invention.

As can be seen in particular in FIGS. 2 and 3, the pressure regulating valve 1 has a valve housing 2. The valve housing 2 has an inlet channel 21 and at least one outlet channel 22, 23 communicating with the inlet channel 21, through which a fluid medium under a system pressure can flow.

A valve seat 4 is arranged in the valve housing 2. This valve seat 4 has a conically shaped receptacle 42 in which an axially movable valve body 3 having an at least partially conically shaped lateral outer surface 33 is mounted.

In the embodiment variant shown in the figures, the valve seat 4 is installed in a receptacle of the valve housing 2 in such a way that it cannot move.

However, it is also conceivable to form the valve seat 4 as a component of the valve housing 2 or to keep the valve body 130 immovable and the valve seat 140 movable, as explained below with reference to FIGS. 8 to 10.

In addition to the conically shaped section 31, the valve body 3 has a head 32 extending from the latter in the direction of its longitudinal axis L in the direction of movement x, which head 32 is guided in a preferably cylindrical receptacle of a guide housing 6 so as to be movable in translation in the direction of the longitudinal axis L.

This guide housing 6 also holds a pressure piston 10, which is coupled to an actuating unit 5 that is used to set a predetermined back pressure and thus to regulate the system pressure to a predetermined value.

This actuating unit 5 is operatively connected with the valve body 3, here via the pressure piston 10.

A through-flow of the pressurized fluid medium from the inlet channel 21 to the at least one outlet channel 22, 23 can be regulated in this case by the valve body 3 in interaction with the valve seat 4.

For this purpose, a first pressure chamber 7 is provided in the valve seat 4, adjacent to the lateral outer surface 33 of the valve body 3, from which a throttle gap 8 extends in each case along the lateral outer surface 33 of the valve body 3 in the direction of movement of the valve body 3 along the longitudinal axis L.

As can be seen in FIGS. 2-5, the conically shaped lateral outer surface 33 of the valve body 3 extends in this case in the direction of movement of the valve body 3 on both sides of the pressure chamber 7 through the correspondingly conically shaped receptacle 42 of the valve seat 4.

FIG. 4 shows a position of the valve body 3 in the valve seat 4, in which a very small gap 8 remains between the lateral outer surface 33 of the valve body 3 and the inner surface of the valve seat 4, through which correspondingly only a small volume of the pressurized medium is able to flow in a predetermined time.

If the system pressure rises, for example as a result of a high-pressure consumer in the high-pressure system in which the pressure regulating valve 1 is installed being switched off, this leads to a pressure increase in the first pressure chamber 7, whereupon a force is exerted on the valve body 3 on the basis of the proportional force vector in the direction L of the longitudinal axis in the direction of increasing cross-section of the valve body 3, thus moving the valve body 3 further into the position shown by way of example in FIG. 5, which leads to a widening of the throttle gap 8 and thus allows a larger volume flow.

Since a range of the high pressure applied in the pressure chamber 7 causes the fluid under high pressure to act exclusively on the lateral outer surface 33 of the valve body 3, the force acting on the valve body 3 in the direction of the longitudinal axis L is significantly reduced compared to an arrangement known from the prior art in which the high pressure also acts on at least one end face of such a valve body 3.

In this context, the end face of a valve body is to be understood as a surface aligned perpendicularly to the direction of movement, on which the force of a fluid under high pressure acts. The term "end face" should not be understood to mean, for example, the face of a groove aligned perpendicularly to the direction of movement, in which the fluid under high pressure acts against both opposite perpendicular faces of the same body, so that the forces acting on these faces cancel each other out.

As can be seen in particular in FIG. 3, in the preferred embodiment variant shown here, a second pressure chamber 24 is integrally formed radially outside the first pressure chamber 7 in a region of the inner circumference of the valve housing 2 adjacent to the valve seat 4, into which the inlet channel 21 opens.

The arrangement of this second pressure chamber 24 radially to the first pressure chamber 7 effectively prevents deformation of the valve seat 4.

Both the first pressure chamber 7 and the second pressure chamber 24 are preferably annular in shape, as can be seen for example in FIG. 2.

The first pressure chamber 7 does not necessarily have to be formed as material recess of the valve seat 4 in this case, as shown in FIG. 3. It is also conceivable to design the first pressure chamber 7 as a connecting or continuation piece of the two throttle gaps 8, i.e., without a material recess on the valve seat 4, so that the first pressure chamber 7 is defined by the inlet of a pressure chamber inlet channel 41 of the valve seat 4 into the cavity of the valve seat 4 accommodating the valve body 3.

As further shown in FIGS. 2 and 3, the valve seat 4, which is designed here as a separate component, is sealed radially outside towards the valve housing 2 by static high-pressure seals 9.

The head 32 of the valve body 3 is sealed towards the inner surface of the guide housing 6 by means of dynamic low-pressure seals 12, since in this area the medium under high pressure applied at the inlet channel 21 has already passed through the throttle gaps 8, wherein outside the valve seat 4 in the transition area to the head 32 of the valve body 3 there is a connection to the outlet channel 22 of the housing. For this purpose, a receiving groove 35 for the low-pressure seal is provided in the region of the head 32.

Instead of the two outlet channels 22, 23 shown here in FIGS. 2 and 3, it is also conceivable to have them open into a single outlet channel via corresponding through-holes in the housing 2.

The housing 2 is also sealed by a low-pressure seal 11 in connection with the cylindrical receptacle 62 of the guide housing 6.

While in the embodiment variants shown in the figures the diameter of the conically shaped receptacle 42 and of the part of the valve body 3 formed with a conically shaped lateral outer surface 33 is designed to increase towards the actuating unit 5, in an alternative embodiment variant (not shown here) it is also conceivable that the diameter of the conically shaped receptacle 42 and of the part of the valve body 3 formed with a conically shaped lateral outer surface 33 is designed to decrease towards the actuating unit 5.

For the latter of the two embodiment variants, an actuating unit 5 is required which can be controlled via a control unit measuring a system pressure, wherein the valve body 3 can be moved into a position enlarging or reducing the throttle gaps 8 depending on the measured system pressure.

Such directional control can be achieved, for example, by means of an electrically actuated lifting cylinder, in which the pressure piston 10 shown in the figures is firmly connected to the valve body 3 and is thus capable of exerting both a tensile and a compressive force on the valve body 3.

In the first-mentioned embodiment variant of the alignment of the conicity of the valve body 3 and the valve seat 4, in which a diameter of the conically shaped receptacle 42 and of the part of the valve body 3 formed with a conically shaped lateral outer surface 33 is designed to increase towards the actuating unit 5, on the other hand, the pressure piston 10 can also be mounted in such a way that it is capable of exerting only a pressure force on the valve body 3.

Furthermore, in this embodiment variant it is also possible to design the actuating unit 5 as a force-regulated control unit, in which the valve body 3 can be moved into a position enlarging or reducing the throttle gaps 8 against the preset force of a force accumulator corresponding to a set pressure, depending on the applied system pressure.

In this case, the force accumulator can be an adjustable spring or a pneumatic cylinder that can be set to as specified set pressure.

If the volume flow increases via the inlet channel 21, this leads to an increase in pressure in the high-pressure area of the pressure regulating valve 1. This causes the throttle gaps 8 between the valve body 3 and the valve seat 4 to widen until the pressure set in the high-pressure area has dropped to the preset system pressure and, accordingly, the hydraulic pressure of the medium applied in the area of the inlet channel 21 is in force equilibrium with the pneumatic cylinder.

As can be seen in FIG. 6, the valve seat 4 has a plurality of pressure chamber inlet channels 41 extending tangentially from the first pressure chamber 7 to the second pressure chamber 24.

The advantage of such a tangential connection, in contrast to a radial inlet of such a pressure chamber inlet channel 41, is the prevention of transverse flow forces in the first pressure chamber 7.

As shown in the alternative embodiment variant of the pressure regulating valve 1 illustrated in FIG. 7, here the conically shaped section 31 of the valve body 3 has a plurality of grooves 34 formed in the lateral outer surface 33 of the valve body 3.

In this case, the grooves 34 are preferably formed in the lateral outer surface 33 of the valve body 3 along a plane perpendicular to the direction of movement of the valve body 3. By forming such grooves 34, the homogenization result is positively influenced when using the pressure regulating valve 1 for homogenizing media.

Hard materials such as hardened steel, hard metal, or even ceramics are preferably used as material for the valve body 3 and the valve seat 4.

A further alternative embodiment variant of a pressure regulating valve 100 according to the invention is described below with reference to FIGS. 8 to 10.

This pressure regulating valve 100 for a fluid medium under system pressure, preferably for system pressures greater than 500 bar, also has a valve housing 120 in which at least one outlet channel 122, 123 is provided for the medium.

As further shown in FIGS. 9 and 10, the pressure regulating valve 100 comprises a valve seat 140 arranged in the valve housing 120 along a displacement axis L and having an at least partially conically shaped receptacle 142 in which a valve body 130 fixed to the valve housing 120 and having an at least partially conically shaped lateral outer surface 133 and an inlet channel 134 is supported.

Accordingly, in this embodiment variant, the valve seat 140 is the moving part and not the valve body 130, in contrast to the embodiment variants described with reference to FIGS. 1 to 7.

Here, an actuating unit 110 is in operative connection with the valve seat 140.

A medium flow from the inlet channel 134 to the at least one outlet channel 122, 123 can also be regulated here by the valve seat 140 in interaction with the valve body 130.

Here, too, a pressure chamber 170 is provided in the valve seat 140 adjacent to the lateral outer surface 133 of the valve body 130, from each of which a throttle gap 180 extends along the lateral outer surface 133 of the valve body 130 in the direction of movement of the valve seat 140.

Likewise, the conically shaped lateral outer surface 133 of the valve body 130 extends in the direction of movement of the valve seat 140 on both sides of the pressure chamber 170 through the correspondingly conically shaped receptacle 142 of the valve seat 140.

As further shown in FIGS. 8 to 10, a neck 132 of the valve body 130 extends through an opening 125 of the valve housing 120 and is secured to the valve housing 120 outside the valve housing 120 by a fastening element 121.

The fastening element 121 is preferably formed as a nut, which is screwed onto an external thread of the neck 132 of the valve body 130.

In a low-pressure chamber 124 of the valve housing 120, the neck 132 expands to such an extent that it abuts an inner wall of the low-pressure chamber 124 with a counter step 136 and is thus fixed to the valve housing 120 with the aid of the fastening element 121, which is formed as a nut.

However, other possible ways of fixing the valve body 130 to the valve housing 120 are also conceivable.

A static low-pressure seal 111 is inserted in the area of the opening 125 for fluidic sealing.

The conical section 132 of the valve body 130 then adjoins the part of the neck 132 of the valve body 130 that has been widened by the step 136, and its lateral outer surface 133, together with the lateral inner surface of the receptacle 142 of the valve seat 140, forms the throttle gaps 180.

The inlet channel 134 extends centrally from a connecting piece outside the valve housing 120 through the neck 132 of the valve body 130 to the region of the conical section 131. From there a plurality of pressure chamber inlet channels 135 preferably extends to the lateral outer surface 133 of the valve body 130 to form the pressure chamber 170 in this region.

As can be further seen in FIGS. 9 and 10, the radial width of the pressure chamber 170 preferably corresponds to the width of the throttle gaps 180.

An embodiment variant similar to that shown in FIG. 3 is also conceivable here, with material recesses in the area of the orifice of the pressure chamber inlet channels 135 on the lateral outer surface 133 of the valve body 3.

Preferably, the pressure chamber inlet channels 135 extend perpendicularly to the lateral outer surface 133 of the valve body 130 in this case.

When pressurized, a force acts on the valve seat 140 due to the proportional force vector in the direction L of the longitudinal axis of the valve seat 140, in the direction of increasing cross-section of the valve seat 4.

The valve seat 4 is moved in this case from the position shown in FIG. 9 to the position shown in FIG. 10, resulting in a widening of the throttle gaps 180 and thus allowing a larger volume flow.

As further shown in FIGS. 9 and 10, the receptacle 142 of the valve seat 140 is pot-shaped having an outlet channel 143 in the bottom of the receptacle 142 opening into a low-pressure chamber 124 of the valve housing 120, through which a portion of the fluid medium can further flow out via the outlet channel 143 of the valve seat 140 through the outlet 122 of the valve horsing 120 after passing through the throttle gap 180 on the left in FIGS. 9 and 10.

A further portion of the fluid medium can flow out via the low-pressure chamber 124 and the outlet 123 in the valve housing 120 after passing through the throttle gap 180 on the right in FIGS. 9 and 10.

The actuating unit 110 shown by way of example in FIGS. 9 and 10 preferably corresponds in this case to the embodiment variant shown in FIGS. 2 and 3, in the form of a pressure piston that is held on the guide housing 160 and can be set to a predetermined counterpressure by an actuating element and thus serves to regulate the system pressure to a predetermined value.

The guide housing 160 is also preferably connected here to the valve housing 120 with the aid of fixing screws 162.

A valve seat receptacle 163 is provided centrally in the guide housing 160, in which a head 144 of the valve seat 140 is accommodated so as to be displaceable in the L direction.

A groove is provided at the head 144 of the valve seat 140 to fluidically seal the valve seat 140 to the guide housing 160, in which groove a dynamic low-pressure seal 112 is accommodated.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Pressure regulating valve
2 Valve housing
21 Inlet channel
22 Outlet channel
23 Outlet channel
24 Ring channel
3 Valve body
31 Conical section
32 Head
33 Lateral outer surface
34 Groove
35 Receiving groove
4 Valve seat
41 Pressure chamber inlet channel
42 Receptacle
5 Actuating unit
6 Guide housing
61 Body
62 Fixing screw
63 Receptacle
7 Pressure chamber
8 Throttle gap
9 Static high-pressure seal
10 Pressure piston
11 Low-pressure seal
12 Dynamic low-pressure seal
100 Pressure regulating valve
110 Actuating unit
111 Low-pressure: seal
112 Dynamic low-pressure seal
120 Valve housing
121 Fastening dement
122 Outlet channel
123 Outlet channel
124 Low-pressure chamber
125 Opening
130 Valve body
131 Conical section
132 Neck
133 Lateral outer surface
134 Inlet channel
135 Pressure chamber inlet channel
136 Counter step
140 Valve seat
141 Conical section
142 Receptacle
143 Outlet channel
144 Head
160 Guide housing
161 Body
162 Fixing screw
163 Valve seat receptacle
170 Pressure chamber
180 Throttle gap
x, y Direction
L Longitudinal axis

The invention claimed is:

1. A pressure regulating valve for a fluid medium under system pressure, the pressure regulating valve comprising:
a valve housing having an inlet channel and at least one outlet channel communicating with the inlet channel;
a valve seat arranged in the valve housing and having a conically shaped receptacle in which an axially movable valve body having an at least partially conically shaped lateral outer surface is mounted;
an actuating unit operatively connected to the valve body, wherein a throughflow of the fluid medium from the inlet channel to the at least one outlet channel is regulatable by an interaction of the valve body with the valve seat; and
a first pressure chamber in the valve seat, wherein the first pressure chamber is adjacent to the lateral outer surface of the valve body, and a throttle gap extends in each case from the first pressure chamber along the conically shaped lateral outer surface of the valve body in a direction of movement of the valve body,
wherein the conically shaped lateral outer surface of the valve body extends in the direction of movement of the valve body on both sides of the pressure chamber through the conically shaped receptacle of the valve seat,
wherein the first pressure chamber is in permanent fluid communication with the inlet channel, and
wherein, in a region of an inner circumference of the valve housing adjacent to the valve seat, a second pressure chamber is integrally formed radially outside the first pressure chamber, and wherein the inlet channel opens into the second pressure chamber.

2. The pressure regulating valve of claim 1, wherein the first pressure chamber and the second pressure chamber have an annular shape.

3. The pressure regulating valve of claim 1, wherein
the valve seat is installed in a receptacle of the valve housing in a manner fixed against movement, or
the valve seat is a component of the valve housing.

4. The pressure regulating valve of claim 1, wherein the actuating unit is controllable by a control unit measuring a system pressure, wherein the valve body is movable into a position enlarging or reducing the throttle gaps depending on the measured system pressure.

5. The pressure regulating valve of claim 1, wherein the actuating unit is a force-regulated control unit, wherein the valve body is movable into a position enlarging or reducing the throttle gaps against a preset force of a force accumulator corresponding to a set pressure, depending on applied system pressure.

6. The pressure regulating valve of claim 1, wherein a diameter of the conically shaped receptacle and a diameter of a portion of the valve body with the conically shaped lateral outer surface increase towards the actuating unit.

7. The pressure regulating valve of claim 1, wherein a diameter of the conically shaped receptacle and a diameter of a portion of the valve body with the conically shaped lateral outer surface decrease towards the actuating unit.

8. The pressure regulating valve of claim 1, wherein the valve seat has a plurality of pressure chamber inlet channels extending from the first pressure chamber tangentially to the lateral outer surface of the valve body towards the second pressure chamber.

9. A pressure regulating valve of claim 1, wherein the conically shaped lateral outer surface of the valve body includes a plurality of grooves.

10. The pressure regulating valve of claim 9, wherein the grooves are formed in the lateral outer surface of the valve body along a plane perpendicular to the direction of movement of the valve body.

11. The pressure regulating valve of claim 1, wherein the valve body and the valve seat are made of a hardened steel, hard metal, or ceramic.

12. The pressure regulating valve of claim 1, wherein the pressure regulating valve is configured for system pressures greater than 500 bar, and wherein the pressure regulating valve does not include dynamic high-pressure contact seals.

13. A pressure regulating valve for a fluid medium under system pressure, the pressure regulating valve comprising:
 a valve housing having a valve housing inlet channel and at least one outlet channel communicating with the valve housing inlet channel;
 a valve seat arranged in the valve housing along a displacement axis, wherein the valve seat has an at least partially conically shaped receptacle in which a valve body fixed to the valve housing is mounted, and wherein the valve body has an at least partially conically shaped lateral outer surface and a valve seat inlet channel;
 an actuating unit operatively connected to the valve seat, wherein a throughflow of the fluid medium from the valve seat inlet channel to the at least one outlet channel is regulatable by an interaction of the valve seat with the valve body; and
 a pressure chamber in the valve seat adjacent to the lateral outer surface of the valve body, wherein a throttle gap extends in each case from the pressure chamber along the lateral outer surface of the valve body in a direction of movement of the valve seat,
 wherein the conically shaped lateral outer surface of the valve body extends in the direction of movement of the valve seat on both sides of the pressure chamber through the conically shaped receptacle of the valve seat, and
 wherein the pressure chamber is in permanent fluid communication with inlet channel.

14. The pressure regulating valve of claim 13, wherein the valve seat inlet channel extends in the direction of movement of the valve seat.

15. The pressure regulating valve of claim 13, wherein the valve body comprises a plurality of pressure chamber inlet channels extending radially from the valve seat inlet channel into the pressure chamber.

16. The pressure regulating valve of claim 13, wherein a radial width of the pressure chamber corresponds to a width of the throttle gaps.

17. The pressure regulating valve of claim 13, wherein the conically shaped receptacle is pot-shaped having an outlet channel opening into a low-pressure chamber of the valve housing in a bottom of the conically shaped receptacle.

18. The pressure regulating valve of claim 13, wherein the pressure regulating valve is configured for system pressures greater than 500 bar, and wherein the pressure regulating valve does not include dynamic high-pressure contact seals.

* * * * *